US008870115B2

(12) United States Patent
Lu et al.

(10) Patent No.: US 8,870,115 B2
(45) Date of Patent: Oct. 28, 2014

(54) ACTIVE VENT AND RE-INFLATION SYSTEM FOR A CRASH ATTENUATION AIRBAG

(75) Inventors: Zi Lu, Coppell, TX (US); Cheng-Ho Tho, Irving, TX (US); Michael R. Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 85 days.

(21) Appl. No.: 13/641,426

(22) PCT Filed: Dec. 29, 2010

(86) PCT No.: PCT/US2010/062300
§ 371 (c)(1),
(2), (4) Date: Oct. 15, 2012

(87) PCT Pub. No.: WO2012/091700
PCT Pub. Date: Jul. 5, 2012

(65) Prior Publication Data
US 2013/0032665 A1    Feb. 7, 2013

Related U.S. Application Data

(63) Continuation-in-part of application No. 13/380,925, filed as application No. PCT/US2009/051815 on Jul. 27, 2009, now Pat. No. 8,588,996, application No. 13/641,426, which is a continuation-in-part of application No. 13/125,884, filed as application No. PCT/US2009/051821 on Jul. 27, 2009, now Pat. No. 8,474,753.

(51) Int. Cl.
*B64C 25/56* (2006.01)
*B64C 25/32* (2006.01)

(52) U.S. Cl.
CPC ............. *B64C 25/56* (2013.01); *B64D 2201/00* (2013.01); *B64C 2025/325* (2013.01)
USPC .................. 244/100 A; 244/17.17; 244/100 R (58) Field of Classification Search
USPC ....... 244/17.17, 100 A, 100 R, 107, 139, 121, 244/138 R, 17.11
See application file for complete search history.

(56) References Cited

U.S. PATENT DOCUMENTS 2,131,528 A  *  9/1938  Soyer ............................. 244/107
2,713,466 A  *  7/1955  Fletcher et al. ............ 244/138 R
(Continued)

FOREIGN PATENT DOCUMENTS

DE          3024551 A1    1/1982
DE          411830 A1    12/1992
(Continued)

OTHER PUBLICATIONS

International Search Report and the Written Opinion of the International Searching Authority mailed by ISA/USA, U.S. Patent and Trademark Office on Feb. 28, 2011 for International Patent Application No. PCT/US10/062300, 9 pages.

(Continued)

*Primary Examiner* — Christopher P Ellis
*Assistant Examiner* — Medhat Badawi
(74) *Attorney, Agent, or Firm* — James E. Walton; Damon R. Hickman (57) ABSTRACT

A crash attenuation system has an airbag inflatable generally adjacent to an exterior of the aircraft. The system includes a gas generator in fluid communication with an interior of the airbag. The system also includes a vent system having a vent passage supported by the aircraft, the vent passage being configured to allow gas to escape from within the airbag during an impact. The vent system also includes an actuator door for sealing the vent passage, thereby preventing gas from leaving the airbag. The actuator door is actuated by an actuator, the actuator being in fluid communication with the gas generator through an actuator duct. The system operates such that deployment of gas from the gas generator causes the actuator to inflate, thereby causing the actuator door to seal the vent passage. The gas generator is configured to re-inflate the airbag after the actuator door seals the vent passage.

18 Claims, 6 Drawing Sheets

(56) References Cited

U.S. PATENT DOCUMENTS

| | | | | |
|---|---|---|---|---|
| 3,602,661 | A | * | 8/1971 | Liedberg .................... 200/61.05 |
| 3,603,535 | A | * | 9/1971 | DePolo ......................... 244/121 |
| 3,727,716 | A | * | 4/1973 | Jenkins ........................ 180/124 |
| 3,738,597 | A | * | 6/1973 | Earl et al. .................. 244/100 A |
| 3,964,698 | A | * | 6/1976 | Earl .......................... 244/100 A |
| 3,981,462 | A | * | 9/1976 | Berezhnoi et al. ......... 244/100 A |
| 3,990,658 | A | * | 11/1976 | Letsinger .................. 244/100 A |
| 4,004,761 | A | * | 1/1977 | McAvoy ................... 244/100 A |
| 4,032,088 | A | * | 6/1977 | McAvoy ................... 244/100 A |
| 4,068,606 | A | * | 1/1978 | Van Veldhuizen .......... 114/67 A |
| 4,657,516 | A | * | 4/1987 | Tassy ........................... 441/125 |
| 5,259,574 | A | * | 11/1993 | Carrot ....................... 244/100 A |
| 5,356,097 | A | * | 10/1994 | Chalupa ........................ 244/139 |
| 5,407,150 | A | * | 4/1995 | Sadleir ......................... 244/12.4 |
| 5,560,568 | A | * | 10/1996 | Schmittle ........................ 244/48 |
| 5,725,244 | A | * | 3/1998 | Cundill ......................... 280/739 |
| 5,765,778 | A | * | 6/1998 | Otsuka .......................... 244/101 |
| 5,836,544 | A | * | 11/1998 | Gentile ....................... 244/17.17 |
| 5,992,794 | A | * | 11/1999 | Rotman et al. ............. 244/17.17 |
| 6,070,546 | A | * | 6/2000 | Downey et al. .............. 114/123 |
| 6,158,691 | A | * | 12/2000 | Menne et al. ............. 244/100 A |
| 6,227,325 | B1 | * | 5/2001 | Shah ............................. 180/274 |
| 6,273,463 | B1 | * | 8/2001 | Peterson et al. ............. 280/739 |
| 6,338,456 | B1 | * | 1/2002 | Cairo-Iocco et al. ......... 244/139 |
| 6,439,256 | B2 | * | 8/2002 | Koelsch et al. ............ 137/68.13 |
| 6,497,389 | B1 | | 12/2002 | Rawdon et al. |
| 6,497,429 | B2 | | 12/2002 | Matsumoto |
| 6,648,371 | B2 | * | 11/2003 | Vendely et al. ............... 280/739 |
| 6,820,898 | B2 | * | 11/2004 | Dinsdale et al. .............. 280/737 |
| 6,886,776 | B2 | * | 5/2005 | Wagner et al. ................ 244/12.4 |
| 7,104,566 | B2 | | 9/2006 | Pinsenschaum et al. |
| 7,232,001 | B2 | * | 6/2007 | Hakki et al. .................. 180/271 |
| 7,690,681 | B2 | | 4/2010 | Hall et al. |
| 7,775,554 | B2 | | 8/2010 | Smydra et al. |
| 7,954,752 | B2 | * | 6/2011 | Smith et al. ................ 244/17.17 |
| 8,348,192 | B2 | * | 1/2013 | Tho et al. ................... 244/100 A |
| 8,418,957 | B2 | * | 4/2013 | Smith et al. ................ 244/100 A |
| 8,474,753 | B2 | * | 7/2013 | Hill et al. ................... 244/100 A |
| 2003/0062443 | A1 | * | 4/2003 | Wagner et al. ............... 244/12.3 |
| 2003/0192730 | A1 | * | 10/2003 | Kikuchi et al. ............... 180/274 |
| 2005/0077426 | A1 | * | 4/2005 | Simard ......................... 244/107 |
| 2007/0246922 | A1 | * | 10/2007 | Manssart ...................... 280/739 |
| 2008/0087511 | A1 | * | 4/2008 | Taylor et al. .................. 188/266 |
| 2010/0044507 | A1 | * | 2/2010 | Smith et al. ................ 244/110 R |
| 2010/0206983 | A1 | * | 8/2010 | Tho et al. ................... 244/100 A |
| 2011/0204181 | A1 | * | 8/2011 | Hill et al. ................... 244/100 A |
| 2011/0226898 | A1 | * | 9/2011 | Smith et al. ................ 244/100 A |
| 2013/0032665 | A1 | * | 2/2013 | Lu et al. ..................... 244/100 A |

FOREIGN PATENT DOCUMENTS

| | | | |
|---|---|---|---|
| EP | 1403180 | A2 | 3/2004 |
| JP | 5322496 | A | 12/1993 |
| JP | 8192797 | | 7/1996 |
| JP | 11268605 | A | 10/1999 |
| WO | 2006046038 | A2 | 5/2006 |
| WO | WO 2006046038 | A2 * | 5/2006 |

OTHER PUBLICATIONS

Extended European Search Report in related European patent application No. 10861426, mailed Feb. 3, 2014, 5 pages.
"CABS Cockpit Air Bag System." Armor Holdings Aerospace & Defense Group, Jan. 2006.
Akif Bolukbasi, "ActiveCrash Protection Systems for UAVs," American Helicopter Society Annual Forum 63 Proceedings, Virginia Beach, VA, May 1-3, 2007.
Akif Bolukbasi, "Active Crash Protection Systems for Rotorcraft," Center for Rotorcraft Innovation/National Rotorcraft Technology Center Program 2007 Year End Review, Phoenix, AZ, Feb. 19-20, 2008.
Rejection Notice for Japanese Application No. 2008-542336, dated Feb. 23, 2011, 1 page.
REAPS Rotorcraft Protection, Brochure by Rafael Armament Development Authority, Ltd., Ordnance Systems Division, Haifa, Israel.
Kevin Coyne, F-111 Crew Module Escape and Survival Systems, pp. 1-10, http://www.f-111.net/ejection.htm.
Specification for PCT/US09/51821 filed on Jul. 27, 2009.
Response to Invitation to Correct Defects for PCT/US09/51821 dated Sep. 16, 2009.
International Search Report for PCT/US09/51821 dated Sep. 11, 2009.
Specification for PCT/US07/82140 filed on Oct. 22, 2007.
International Search Report for PCT/US07/82140 dated Apr. 18, 2008.
Article 34 Amendments for PCT/US07/82140 filed on Aug. 18, 2008.
International Publication of PCT/US07/82140 published on Apr. 30, 2009.
Article 34 Amendments for PCT/US07/82140 filed on Oct. 13, 2009.
Office Action from Corresponding Canadian Application No. 2,628,380, dated Dec. 23, 2009.
Office Action for U.S. Appl. No. 12/089,884, dated Aug. 6, 2010.
Office Acton for U.S. Appl. No. 12/089,884, dated Dec. 8, 2010.
Notice of Allowance for U.S. Appl. No. 12/089,884, dated Jan. 26, 2011.
Office Action from Corresponding Canadian Application No. 2,628,380, dated Feb. 8, 2011.
First Examination Report from Corresponding Mexican Application No. Mx/2008/0060008, dated Mar. 22, 2011; Received in Office Apr. 6, 2011.
International Search Report for PCT/US06/43706 dated Jul. 18, 2008.
International Preliminary Report on Patentability for PCT/US06/43706 dated Mar. 19, 2009.
First Office Action in Chinese Application No. 200680041870.7 by the Chinese Patent Office, dated Apr. 29, 2011.
Notification of the Decision to Grant a Patent Right For Patent for Invention issued by the Patent Office of the People's Republic of China for related Chinese Patent Application No. 200680041870.7 on Jan. 21, 2012.
First Office Action from application 200780102216. Issued from the Chinese Patent Office dated Apr. 27, 2012, 5 pages.
Extended European Search Report dated Aug. 6, 2012 from related European Patent Application No. 07844510.3
Specification for PCT/US06/43706 filed Nov. 8, 2006.
Response to Invitation to Correct Defects for PCT/US06/43706 dated Apr. 7, 2008.
Publication of PCT/US06/43706 dated May 8, 2008.
International Preliminary Report on Patentability mailed by IPEA/US on Sep. 28, 2011 for International Patent Application No. PCT/US09/51815, 4 pages.
International Search Report and the Written Opinion of the International Searching Authority mailed by ISA/USA, U.S. Patent and Trademark Office on Apr. 25, 2011 for International Patent Application No. PCT/US11/025857, 8 pages.
International Search Report and the Written Opinion of the International Searching Authority mailed by ISA/USA, U.S. Patent and Trademark Office on Jun. 13, 2011 for International Patent Application No. PCT/US11/030514, 8 pages.
International Publication of related PCT Application No. PCT/US/09/051821 filed Jul. 27, 2009; Publication No. WO 2011/014153 A1.
Office Action Issued from the Canadian Intellectual Property Office dated Jul. 25, 2014 from corresponding application No. 2,821,326.
Office Action dated Aug. 6, 2014 from counterpart EP App. No. 11859409.2.

* cited by examiner

ACTIVE VENT AND RE-INFLATION SYSTEM FOR A CRASH ATTENUATION AIRBAG

TECHNICAL FIELD

The system of the present application relates to airbags for a vehicle. In particular, the system of the present application relates to a vent system for use with external airbags for an aircraft.

DESCRIPTION OF THE PRIOR ART

Conventional airbag systems typically don't have a means for resealing after venting during a crash. As such, the airbag vents through a blow-away valve, or the like. Other conventional airbag systems may rely upon a designated actuator system for controlling airflow and/or sealing an airbag vent passage. A designated actuator system adds complexity and weight to the aircraft.

Although the developments in airbag systems have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The inflatable crash attenuation system of the present application includes one or more airbags that are inflated prior to impact so as to reduce occupant injury and aircraft structure damage and vented during impact so as to prevent an undesired secondary impact. The system is configured to be selectively re-inflated after venting. The system can be used on a number of different types of aircraft, for example, helicopter, fixed wing aircraft, and other aircraft, and in particular those that are rotorcraft.

Figure 1:
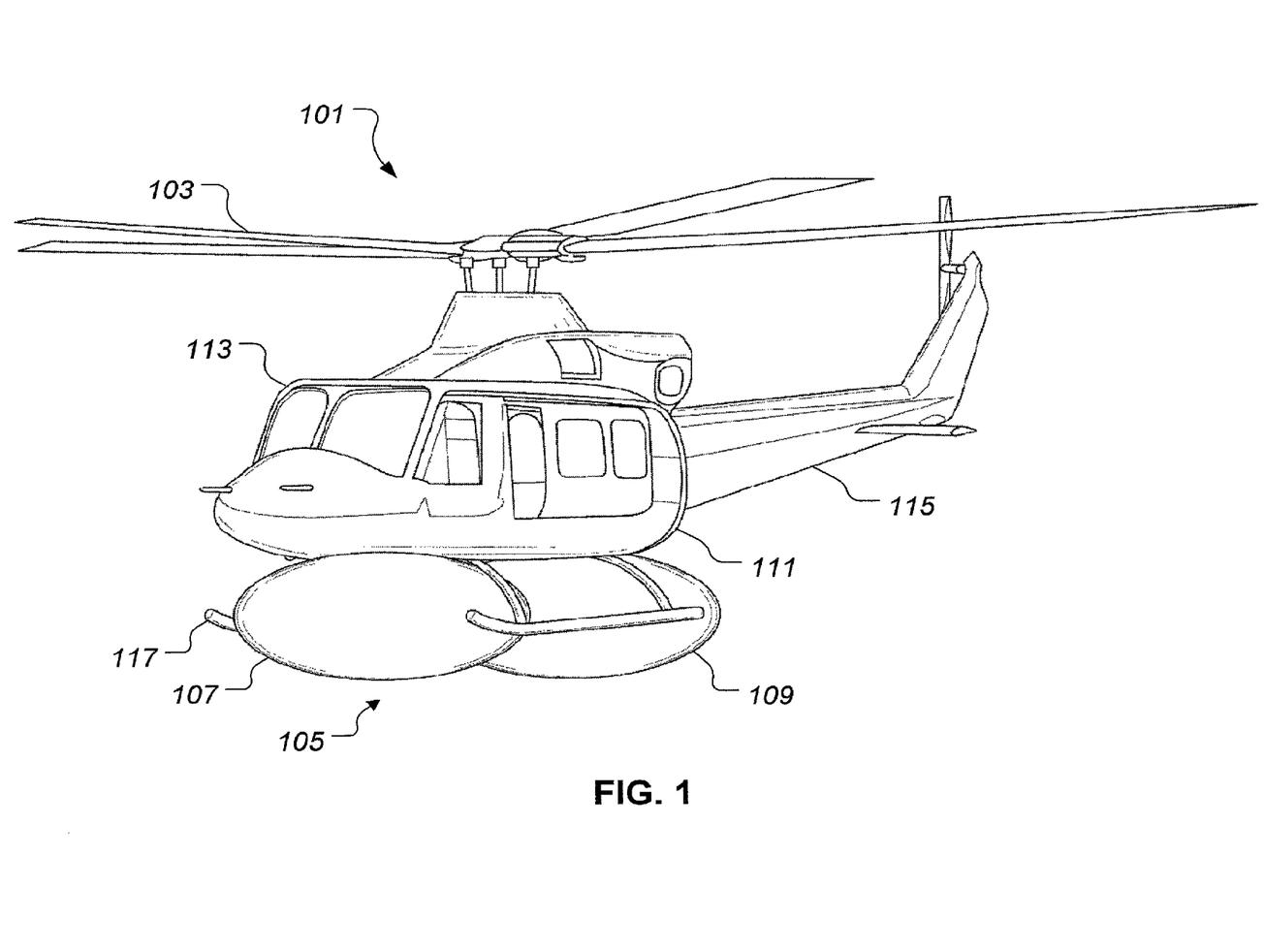
FIG. 1 is a perspective view of a rotorcraft equipped with an external airbag system.

FIG. 1 shows a rotorcraft 101 incorporating the crash attenuation system according to the present disclosure. Rotorcraft 101 comprises a fuselage 111 and a tail boom 115. A rotor system 103 provides lift and propulsive forces for flight of rotorcraft 101. A pilot sits in a cockpit 113 in a forward portion of fuselage 111. A landing gear 117 extends from a lower portion of fuselage 111 for supporting rotorcraft 101 on a rigid surface, such as the ground. It should be appreciated that even though landing gear is depicted as skid gear, the systems of the present application may be implemented on a rotorcraft having other types of landing gear, such as a retractable landing gear, as an example.

A malfunction with rotor system 103, the drive system, or any other flight critical component, may necessitate a descent from altitude at a higher rate of speed than is desirable. If the rate is an excessively high value at impact with the ground or water, the occupants of rotorcraft 101 may be injured. Further, such an impact may cause rotorcraft 101 to be severely damaged by the decelerative forces exerted on rotorcraft 101. To reduce these forces, an external airbag system comprising inflatable, non-porous airbags 107 and 109 is installed under fuselage 111. Though not shown in the drawings, airbags 107 and 109 are stored in an un-inflated condition and are inflated under the control of a crash attenuation control system.

It should be appreciated that the quantity and geometry of airbags 107 and 109 may take on a variety of configurations. Each airbag, such as airbag 107, preferably has a relatively non-porous bladder. In a preferred embodiment, the bladder is formed of a fabric that comprises resilient material such as Kevlar and/or Vectran. A vent may communicate with the interior of the bladder, allowing for gas to controllably escape from within the airbag 107.

Figure 2:
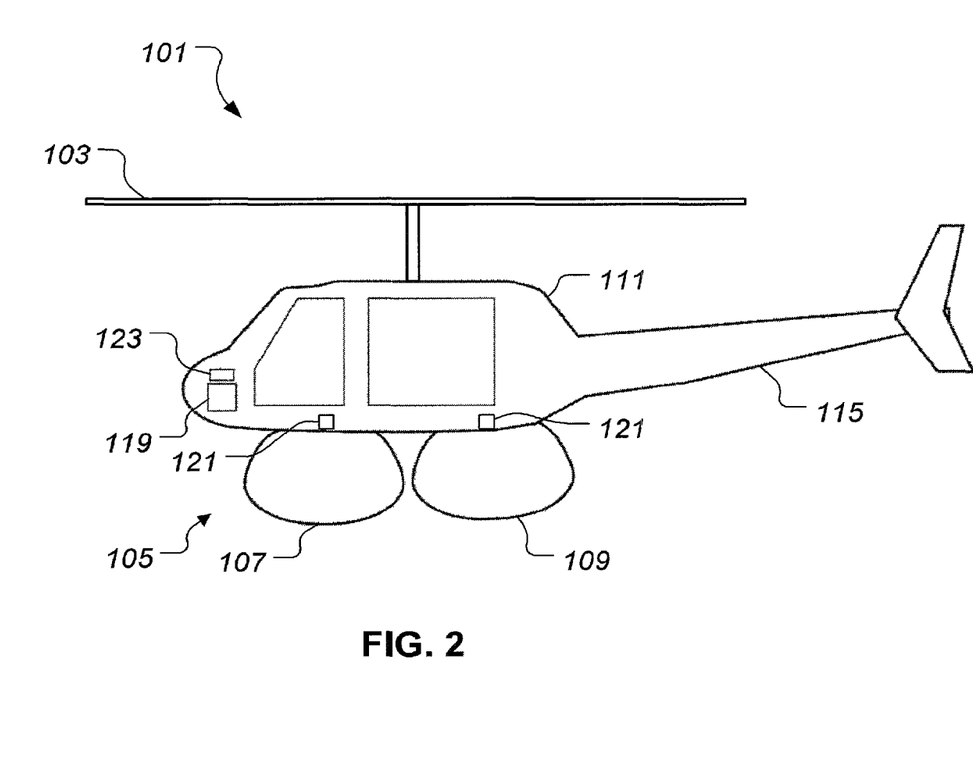
FIG. 2 is stylized block diagram of the rotorcraft shown in FIG. 1.

FIG. 2 shows airbags 107 and 109 mounted to a lower portion of fuselage 111 and shows additional components of the crash attenuation system according to the present disclosure. A computer-based control system 119, which is shown mounted within fuselage 111, is provided for controlling the operation of components associated with airbags 107 and 109. Each airbag 107 and 109 has a gas controller 121 for controlling one or more gas generators 305a-305e (shown in FIGS. 4-6) for inflation of the airbags 107 and 109. In addition, the crash attenuation system has a sensor system 123 for detecting crash conditions used to control external airbag system 105, such as rate of descent and/or ground proximity. External airbag system 105 may also have a water-detection system (not shown), which may have sensors mounted on fuselage 111 for detecting a crash in water. Gas controller 121, components for airbags 107 and 109, and sensor system 123 are in communication with control system 119, allowing control system 119 to communicate with, monitor, and control the operation of these attached components. In addition, control system 119 may be in communication with a flight computer or other system for allowing the pilot to control operation of the crash attenuation system. For example, the pilot may be provided means to override, disarm, or arm the crash attenuation system.

The sensor system 123 is shown in FIG. 2 as a discrete component for the sake of convenience. However, it should be noted that actual implementations of the sensor system 123 can comprise a number of components that are located at various locations on the rotorcraft 101. The sensor system 123 may include, for example, sensors for detecting pitch and roll attitude, pitch and roll rate, airspeed, altitude, rate of descent, fluid at impact surface, and slope of the impact surface.

Figure 3:
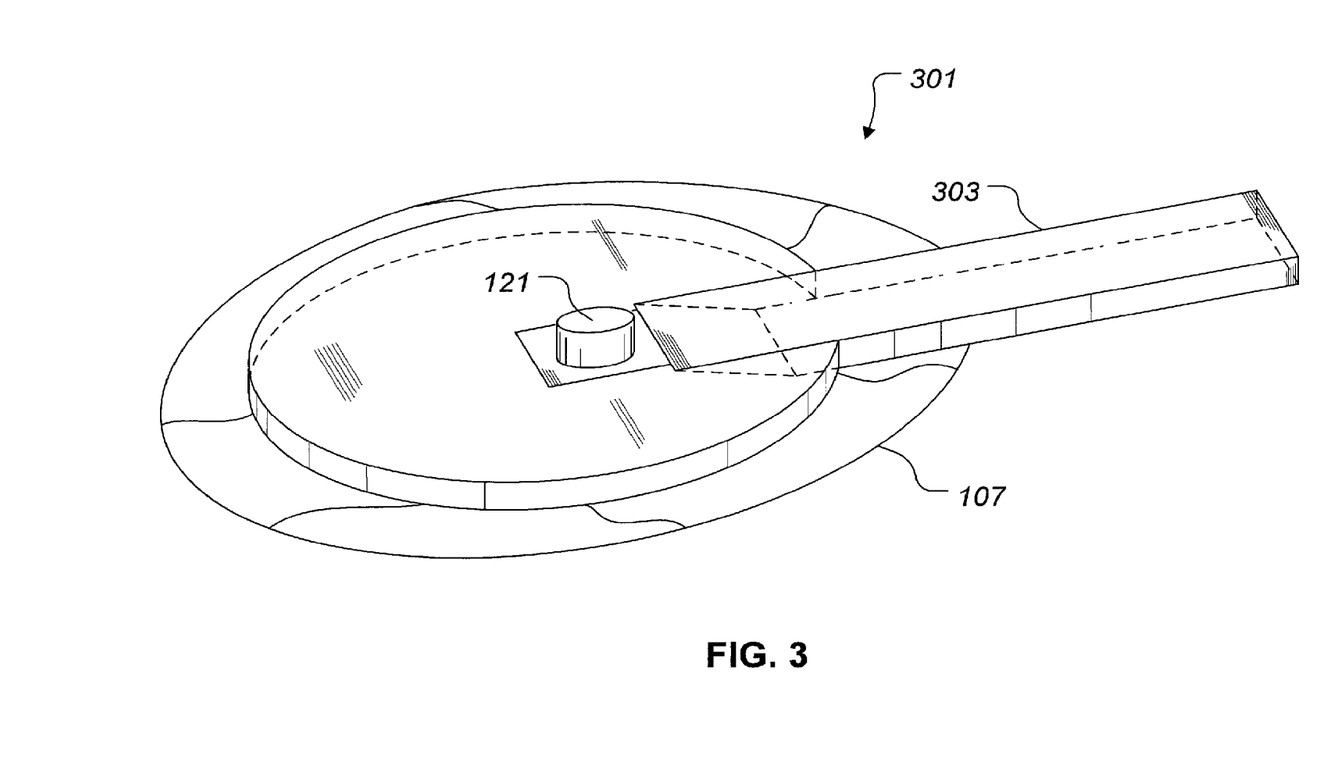
FIG. 3 is a partial perspective view of a vent and re-inflation system, according to the preferred embodiment of the present application.

FIG. 3 shows a partial top view of a vent and re-inflation system 301. System 301 includes a vent passage 303 configured to selectively vent air from airbag 107. Vent passage 303 is formed by rigid substrates, such as sheet metal, composite structure, or another rigid material. Vent passage 303 is preferably long enough to extend beyond the upper portion of airbag 107 in order to prevent airbag 107 from inadvertently acting as a seal against second opening 309. Gas controller 121 selectively controls the operation of gas generators 305a-305e (shown in FIGS. 4-6), which are in fluid communication with an interior of airbag 107. It should be appreciated that vent and re-inflation system 301 is discussed herein with regards to airbag 107 to the sake of clarity. However, vent and re-inflation system 301 is also included as part of airbag 109. Furthermore, vent and re-inflation system 301 may be included in a wide variety of airbag system configurations.

Figure 4:
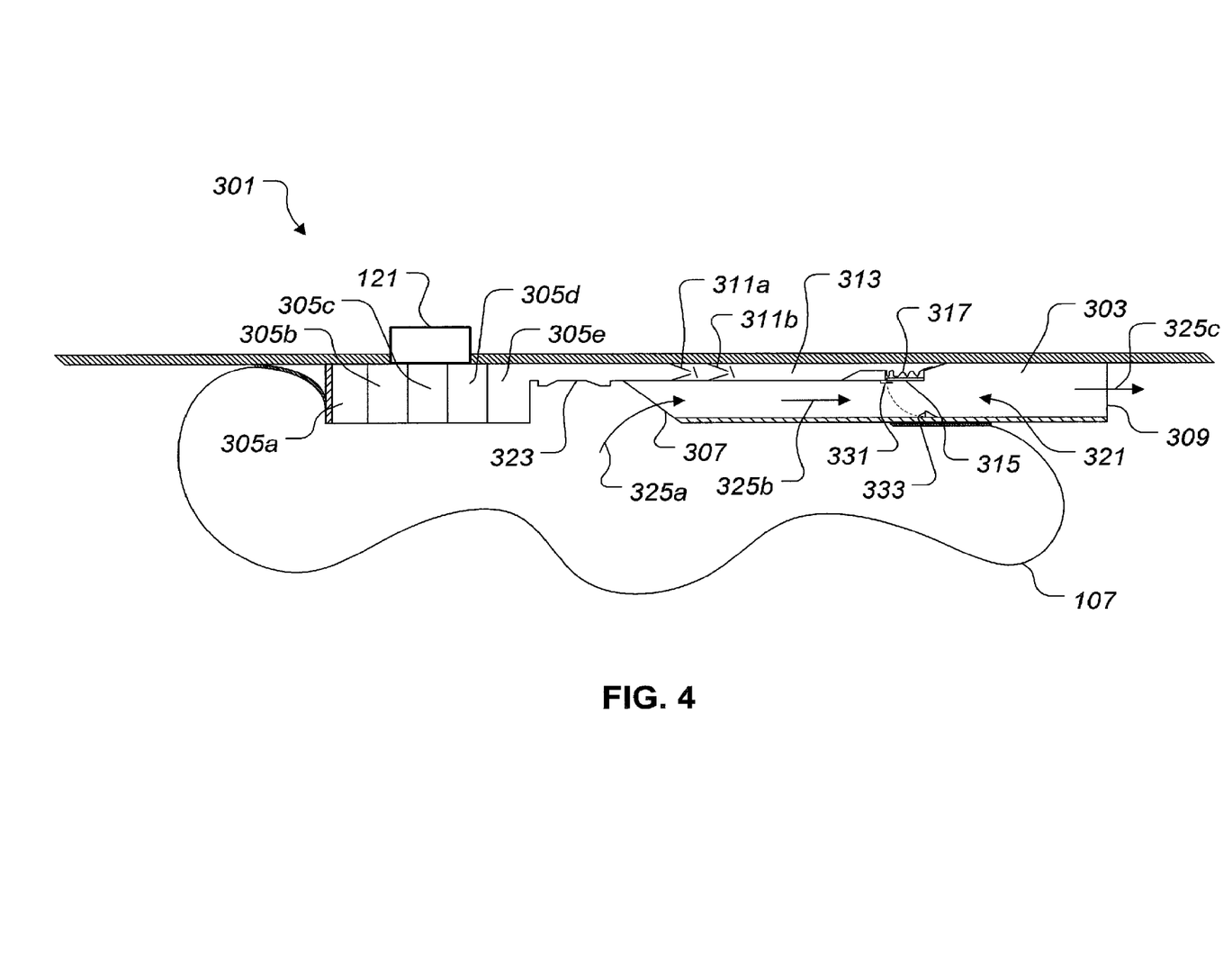
FIG. 4 is a partially sectioned side view of the vent and re-inflation system shown in FIG. 3.
Figure 5:
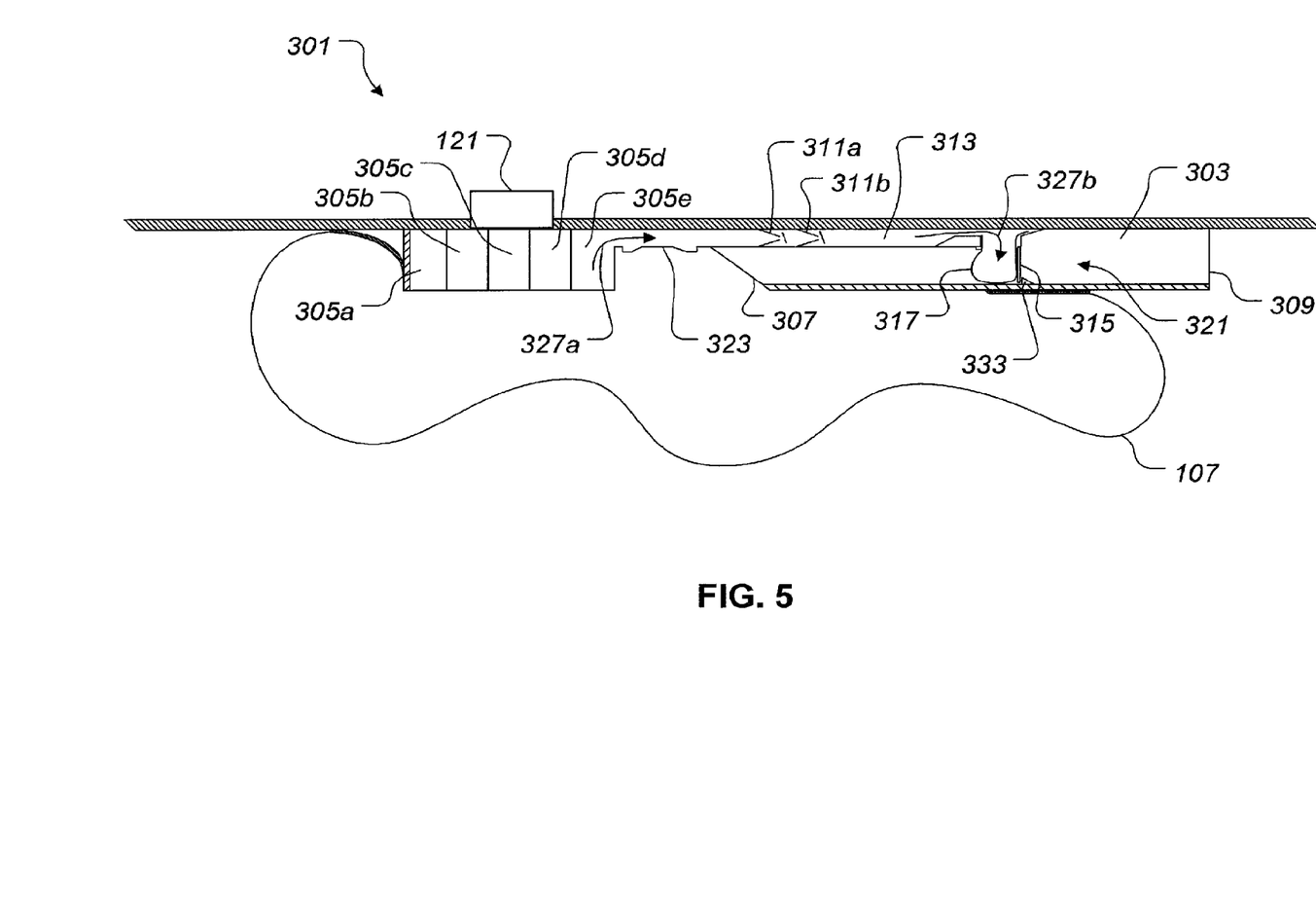
FIG. 5 is a partially sectioned side view of the vent and re-inflation system shown in FIG. 3.
Figure 6:
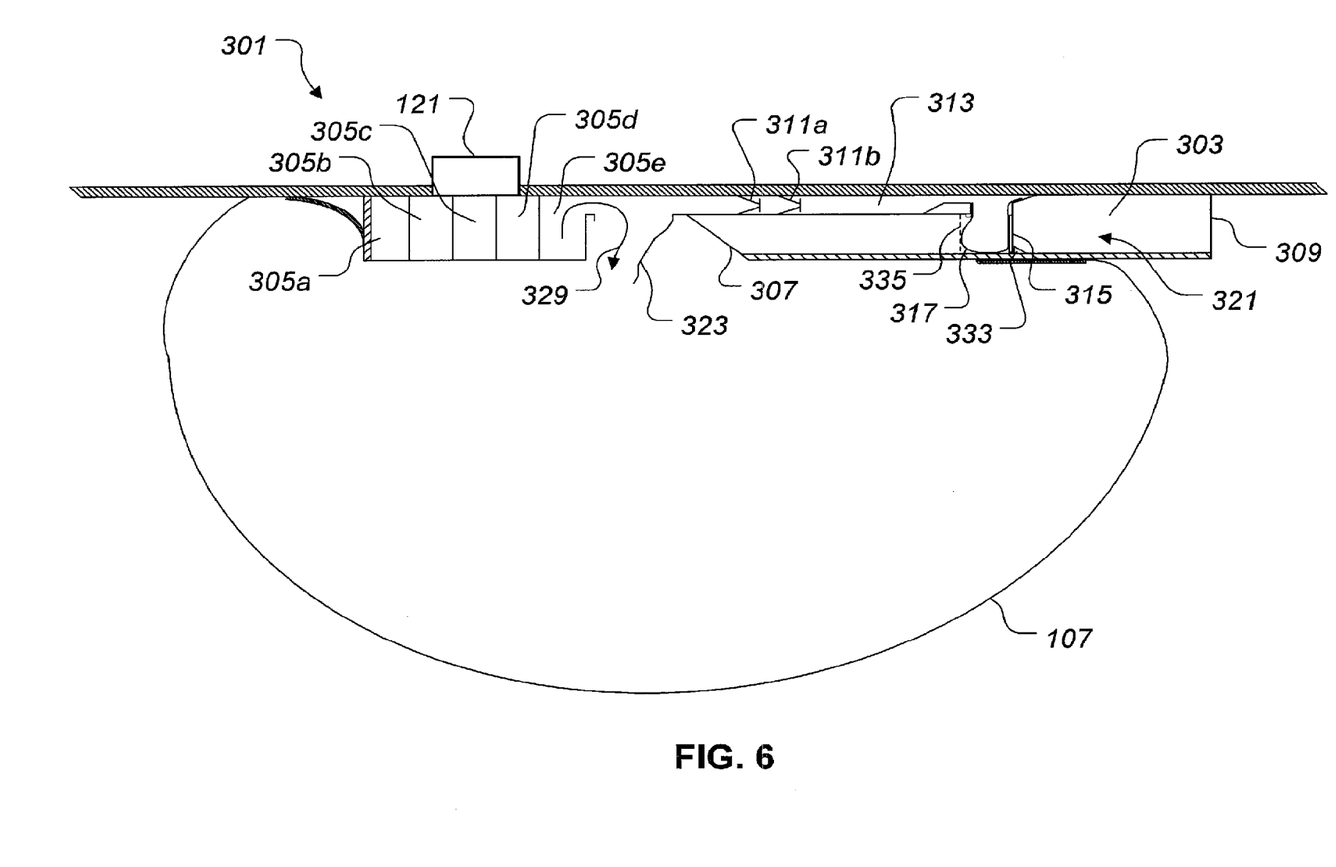
FIG. 6 is a partially sectioned side view of the vent and re-inflation system shown in FIG. 3.

FIGS. 4-6 show stylized side views of vent and re-inflation system 301 at different stages of operation. System 301 includes a plurality of gas generators 305a-305e. Vent passage 303 extends between a first opening 307 and a second opening 309. First opening 307 facilitates fluid communication between an interior of airbag 107 and vent passage 303. Similarly, second opening 309 facilitates fluid communication between vent passage 303 and an exterior environment. Vent passage 303 may include one or more flow valves to selectively change the flow rate of gas venting through vent passage 303.

The gas generators 305a-305e may be of wide variety of configurations and various types, such as gas-generating chemical devices, combustive systems, and compressed air, to name a few, for providing gas for inflation of airbags 107 and 109. For example, gas generators 305a-305e may be individual gas generators, such that each gas generator is independently operable to selectively provide pressurized gas to the interior of airbag 107 or actuator duct 313. Further, gas generators 305a-305e may be a plurality of ports, each port being connected to a singular gas generator that is configured to selectively operate and direct pressurized gas to one or more ports.

FIG. 4 illustrates system 301 in a deflating mode, such that gas is leaving airbag 107 through vent passage 303, as indicated by arrows 325a-325c. Deflating mode occurs to provide controlled energy attenuation during an impact, as well as prevent a secondary impact. Prior to the deflating of airbag 107 during impact, airbag 107 was fully inflated by gas generators 305a-305d. Preferably, at least one gas generator, such as gas generator 305e, is reserved for re-inflation of airbag 107, as discussed further herein.

Re-inflation of airbag 107 is particularly advantageous when rotorcraft 101 has an impact on a fluid surface, such as a lake, river, ocean, and the like. Re-inflation of airbag 107 allows airbag 107 to serve as a flotation device, in addition to initially providing crash attenuation. By configuring airbag 107 to serve dual purposes of crash attenuation and subsequent flotation, system 301 is more efficient and lightweight than having two separate and distinct crash attenuation and flotation systems.

FIG. 5 illustrates system 301 in a vent closing mode, which occurs after airbag 107 has been vented during impact (as shown in FIG. 4). System 301 includes a pneumatic actuator assembly 321. Pneumatic actuator assembly 321 includes an actuator duct 313, an actuator airbag 317, and an actuator door 315. In the preferred embodiment, sensor system 123 determines that rotorcraft 101 has made impact with on a liquid surface. Gas controller 121 then receives a signal instructing the gas controller 121 to expend gas generator 305e in order to close vent passage 303 and re-inflate airbag 107. Gas generator 305e sends high pressure gas through the actuator duct 313 and into actuator airbag 317. High pressure gas from gas generator 305e forces actuator airbag 317 to expand, thereby closing actuator door 315. The closing of actuator door 315, with actuator airbag 317, results in a seal so that gas can no longer evacuate (or enter) through vent passage 303. Actuator airbag 317 is preferably of a resilient non-porous material, similar to that of airbag 107. When actuator airbag 317 fills with gas from gas generator 305e, actuator airbag 317 applies positive forces against actuator door 315. In an alternative embodiment, a porous grate 335 (shown in FIG. 6), or screen, may be located upstream in vent passage 303 in order to keep actuator airbag 317 from bulging away from actuator door.

Actuator door 315 is preferably hinged so that it rotates about the hinge during deployment. Prior to deployment, actuator door 315 is held open by a shear pin 331. Shear pin 331 is configured to shear off when actuator airbag 317 builds with pressure, thereby releasing actuator door 315. It should be appreciate that actuator door 315 may take on a wide variety of configurations.

Referring now to FIG. 6, after actuator airbag 317 is fully deployed, thus resulting in the closing of actuator door 315, back pressure builds from the continued expelling of gas from gas generator 305e. The resulting pressure causes a blow-away door 323 to open, thereby allowing the gas generator 305e to re-inflate airbag 107. Direction arrow 329 indicates the path of gas from gas generator 305e into airbag 107. At this stage, airbag 107 is acting as a flotation airbag. As the blow-away door 323 opens, it is preferred that one-way valves 311a and 311b operate to prevent the deflation of actuator airbag 317 via actuator duct 313. In an alternative embodiment, a latch, or similar device, is used to prevent actuator door 315 from releasing from the closed position, in lieu of one-way valves 311a and 311b. Blow-away door 323 may be any pressure relief valve capable of diverting gas into airbag 107 after a predetermined pressure has been reached.

Actuator door 315 preferably sits against a stop 333, or frame that facilitates sealing contact between actuator door 315 and the interior of vent passage 303. Furthermore, a compliant seal may be used between stop 333 and actuator door 315 to facilitate sealing contact therebetween.

With airbag 107 re-inflated, airbag 107 functions to supplement flotation of rotorcraft 101. It should be appreciated that other flotation bags may be used to augment the flotation provided by airbag 107. For example, one or more outrigger flotation airbags may be deployed at the outboard portions of the rotorcraft 101 in order to contribute to flotation and stability.

The system of the present application provides significant advantages, including: (1) allowing the crash attenuation airbag to function as a flotation airbag subsequent an impact; (2) providing an actuator system that is actuated by the gas generator system that is used to initially inflate the crash attenuation airbag; and (3) allowing the gas generator system to function as to close the actuator door, in addition to inflating and re-inflating the airbag.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A crash attenuation system for an aircraft, the system comprising:
    an airbag inflatable generally adjacent to an exterior of the aircraft;
    a first gas generator in fluid communication with an interior of the airbag for inflating the airbag with gas; and
    a vent system, the vent system comprising:
        a vent passage being configured to allow gas to escape from within the airbag during an impact;
        an actuator door configured to selectively seal the vent passage, thereby preventing gas from leaving the airbag;
        an actuator located proximate to the actuator door; and
        an actuator duct that provides fluid communication between a second gas generator and the actuator;
        wherein deployment of gas from the second gas generator causes the actuator to inflate, thereby causing the actuator door to seal the vent passage.

2. The crash attenuation system according to claim 1, wherein the actuator is an airbag actuator.

3. The crash attenuation system according to claim 1, wherein the actuator is a pneumatic actuator.

4. The crash attenuation system according to claim 1, the vent system further comprising:
    a latch configured to lock the actuator door in the closed position.

5. The crash attenuation system according to claim 1, the vent system further comprising:
    a one-way valve located in the actuator duct to prevent gas from moving away from the actuator.

6. The crash attenuation system according to claim 1, the vent system further comprising:
    a pressure release valve configured to allow gas from the second gas generator to re-inflate the airbag after the actuator door has created a seal in the vent passage.

7. The crash attenuation system according to claim 6, wherein the pressure release valve is a blow-away door.

8. The crash attenuation system according to claim 1, further comprising:
    a sensor system configured to detect a type of crash impact surface; and
    a control system configured to selectively re-inflate the airbag based on the detected type of crash impact surface.

9. The crash attenuation system according to claim 1, wherein the actuator door is hingedly connected to the vent passage.

10. The crash attenuation system according to claim 1, further comprising:
    a stop located in the vent passage, the stop being configured so that the actuator door is closed against the stop.

11. The crash attenuation system according to claim 10, further comprising:
    a seal between the stop and the actuator door.

12. The crash attenuation system according to claim 1, further comprising:
    a grate located in the vent passage, the grate being configured to provide positive pressure against the actuator when the actuator is deployed.

13. The crash attenuation system according to claim 1, further comprising:
    a shear pin configured to selectively keep the actuator door in an open position.

14. A method of operating a crash attenuation airbag on an aircraft, the method comprising:
    detecting a crash condition of the aircraft, the crash condition indicating that subsequent flotation of the aircraft is desirable;
    inflating the crash attenuation airbag prior to impact, the inflating occurring with a gas generator;
    venting the crash attenuation airbag during impact, the venting occurring by allowing gas to exit the airbag through a vent passage;
    sealing the vent passage in order to cease venting of the airbag, the sealing of the vent passage occurring by closing an actuator door by communicating pressurized gas to an actuator, the pressurized gas sourcing from the gas generator, the actuator expanding from the pressurized gas so as to forcibly close the actuator door; and
    re-inflating the airbag with the gas generator so that the airbag aids in flotation of the aircraft.

15. The method according to claim 14, wherein the step of re-inflating the airbag occurs when a blow-away door allows air to enter the airbag.

16. The method according to claim 14, wherein the step of sealing the vent passage closes the actuator door against a stop, the stop being located in the vent passage.

17. The method according to claim 14, wherein the step of sealing the vent passage shears a shear pin so as to allow the actuator door to release.

18. The method according to claim 14, wherein the gas generator has a plurality of ports, each port being independently capable of providing pressurized gas, each port also being controlled by a gas controller.

* * * * *